United States Patent [19]
Cherri et al.

[11] Patent Number: 4,807,202
[45] Date of Patent: Feb. 21, 1989

[54] VISUAL ENVIRONMENT SIMULATOR FOR MOBILE VIEWER

[76] Inventors: Allan Cherri, 330 N. Mathilda #904, Sunnyvale, Calif. 94086; Peter W. Cooper, Rd. 2 Box 177A, Cherry Tree, Pa. 15724

[21] Appl. No.: 853,307

[22] Filed: Apr. 17, 1986

[51] Int. Cl.$^4$ .......................... G09G 3/00; G06G 7/78
[52] U.S. Cl. ..................................... 367/129; 434/44
[58] Field of Search ............. 364/522, 578; 273/85 R; 434/43, 44; 367/118, 129

[56] References Cited

U.S. PATENT DOCUMENTS

| | | | |
|---|---|---|---|
| 1,937,026 | 11/1933 | Loth | 367/118 X |
| 3,428,789 | 2/1969 | Richard | 367/117 X |
| 3,569,920 | 3/1971 | Antman | 367/129 X |
| 3,588,796 | 6/1971 | Armistead | 367/129 X |
| 3,777,305 | 12/1973 | Stoutmeyer | 367/129 X |
| 3,869,694 | 3/1975 | Merchant et al. | 367/129 X |
| 3,947,804 | 3/1976 | Olson | 367/129 X |
| 4,001,771 | 1/1977 | Amrine et al. | 367/129 |
| 4,031,500 | 6/1977 | Parent | 367/129 X |
| 4,347,507 | 8/1982 | Spooner | 434/44 X |
| 4,558,359 | 12/1985 | Kuperman et al. | 364/522 X |
| 4,634,384 | 1/1987 | Neves et al. | 434/44 |

*Primary Examiner*—Thomas H. Tarcza
*Assistant Examiner*—Mark Hellner
*Attorney, Agent, or Firm*—Rosenblum, Parish & Bacigalupi

[57] ABSTRACT

A visual environment simulator for a viewer moving about in a device implementation space. A display screen shows the viewer images of another environment. An array of three separately positioned ultrasonic transmitters sends intermittent signals to each of three ultrasonic receivers in order to monitor the change in the spatial coordinates and the orientation angles of the viewer and/or mobile unit(s) carrying or carried by the viewer. Digital circuitry is provided for sending and receiving sonic signals in a predetermined time sequence, and for sending a cue pulse to accurately initiate the counting of the transit time for each separate sonic signal. The transit time data are processed and revised video images are shown to correspond with the change of location (3-dimensional translational displacements) and change of orientation (3-axis rotational displacements) along and about the line-of-sight of the viewer.

16 Claims, 10 Drawing Sheets

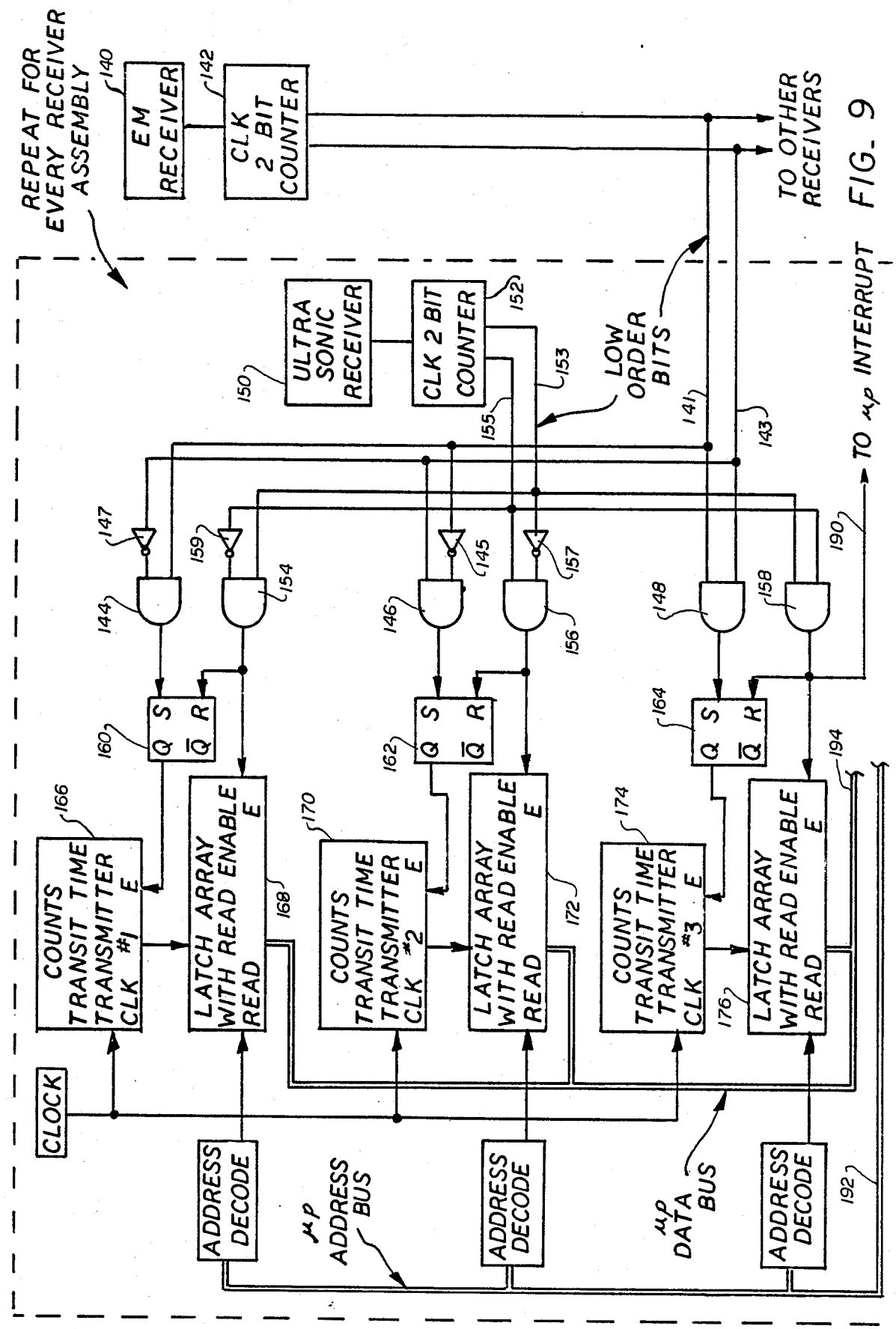

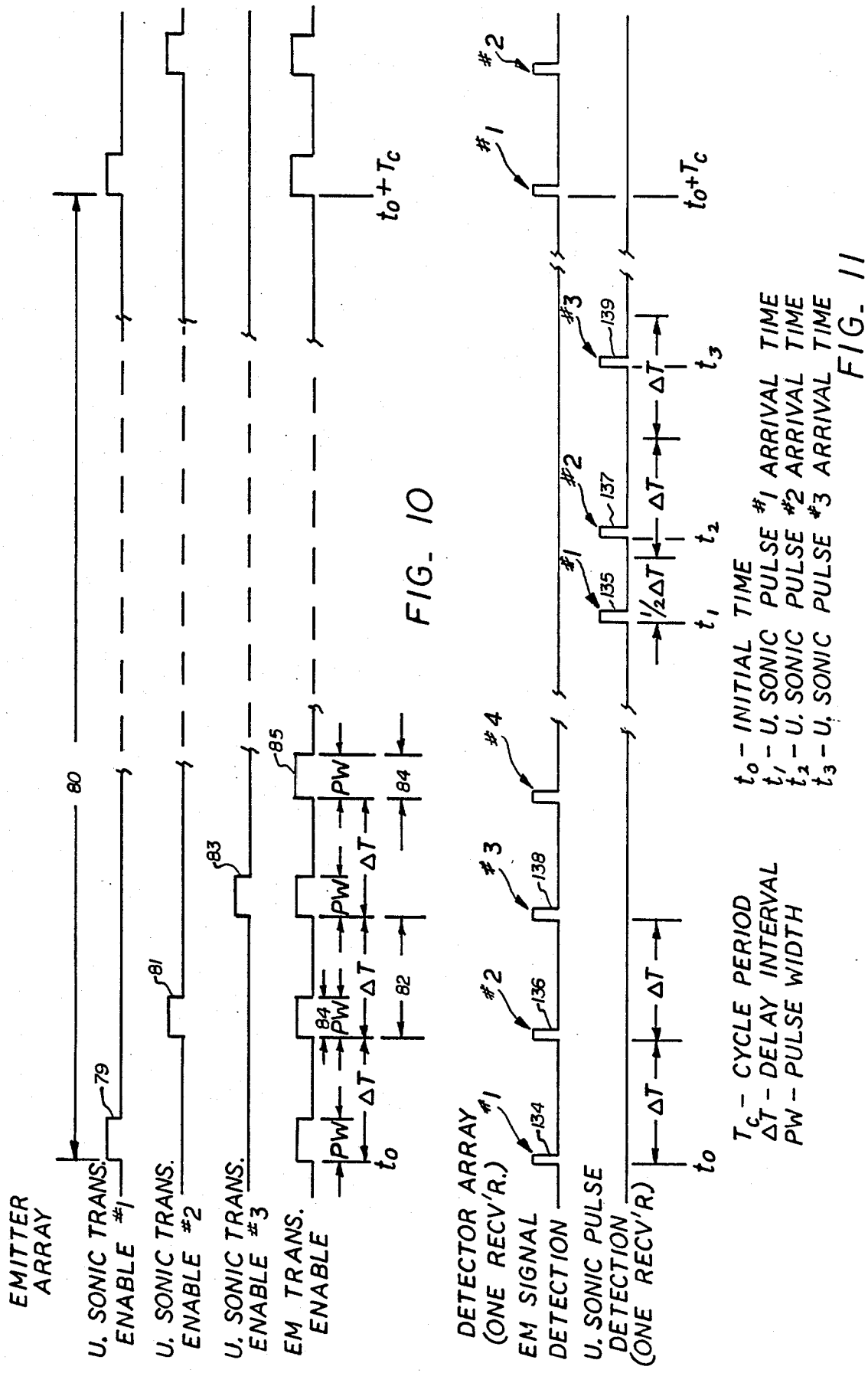

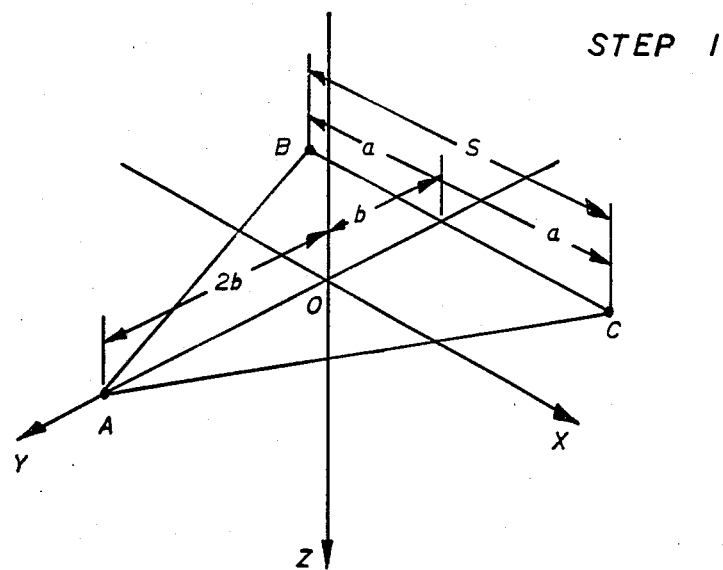
FIG_ 12A
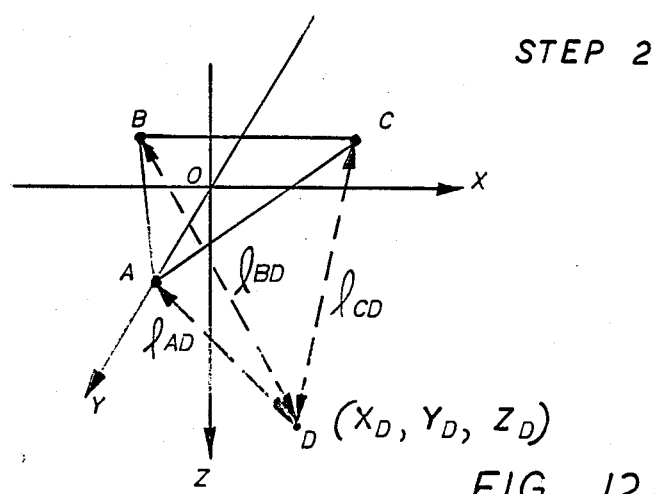
FIG_ 12B

VISUAL ENVIRONMENT SIMULATOR FOR MOBILE VIEWER

BACKGROUND OF THE INVENTION

This invention relates generally to the field of position tracking systems and video-imaging systems, and more specifically a method and apparatus for accurately detecting from a remote distance the location and orientation of a moving person or vehicle in order to make corresponding changes of images displayed on a viewing screen.

There are various prior art patents and devices which relate to simple, one-purpose detection systems. However, the extent of movement monitored is very limited and the techniques relatively crude and/or complicated. Typical examples of such prior art devices are U.S. Pat. No. 3,678,283 issued July 18, 1972 for Radiation Sensitive Optical Tracker, U.S. Pat. No. 4,124,838 issued Nov. 7, 1978 for Apparatus For Position Determination, U.S. Pat. No. 3,745,519 issued July 10, 1973 for Small Craft Positioning System, U.S. Pat. No. 3,869,694 issued Mar. 4, 1975 for Ultrasonic Control Apparatus For An Oculometer, and U.S. Pat. No. 3,670,097 issued June 13, 1972 for Stereoscopic Television System and Apparatus.

However, none of the aforementioned prior art devices provide the simplicity and precision required for monitoring a mobile unit and/or an individual person which move through a device implementation space and change their lateral and vertical placement as well as their line-of-sight orientation. More specifically, even though the technology exists for visually displaying a three dimensional environment on a screen, there has been no known technique or apparatus developed for allowing a person to move through a simulated environment while simultaneously observing through a viewing screen the resulting image changes in size, vantage point, and depth perception based on the location and rotational orientation along the line-of-sight of the viewer as if the viewer were actually moving through such an environment.

Accordingly, it is an object of the present invention to overcome the deficiencies of the limited prior art techniques for position tracking, and to provide an improved and reliable method and apparatus for placing a person in a simulated environment and allowing him to experience the visual consequences of moving about in such environment without having to physically construct the components of the environment and without having to place a person physically therein.

It is an object of the present invention to provide a method and apparatus which enables a viewer to see and experience the visual impressions of walking around a pre-determined environment without actually being present in that environment. A related object is to provide a viewing screen connected directly to video information and video data storage in a computer memory so that an updated representation of the simulated environment will appear on the screen based on the position with respect to a fixed coordinate system, the direction of the line-of-sight of the viewer, and an associated rotation about this line-of-sight.

Another object is to provide an invention of the aforesaid characteristics which has implements a simple method of identifying the position of the viewer many times during each second so that the corresponding changes on the display screen can also be made many times during each second to provide a motion picture with movements which occur smoothly as viewed by the naked eye, with minimal lag time between movement and its related image change.

A further object is to use a one-way sonic signal which travels directly between a sonic transmitter and a sonic receiver, and to provide a time measuring system to accurately determine the precise time elapsed between the departure of the sonic signal from the transmitter and the arrival of the sonic signal at the receiver. A related object is to provide a sufficiently high frequency electromagnetic (EM) pulse such as a UHF or infrared (IR) signal which commences traveling at the same instant as the sonic signal, thereby providing a precise indicator of the departure time of the signal.

Another object of the present invention is to provide a method of differentiating between ultrasonic signals generated from transmitters physically separated from each other so that a receiver can identify the source of each ultrasonic signal which is received. A related object is to provide a method of generating ultrasonic signals in a predetermined timing sequence, thereby eliminating any need for sensing the direction travelled by the signal and also eliminating the need for encoding the signal with an origin identification.

A further object of the invention is to determine the relative change of a mobile unit's position remotely without having to visually observe the change, thereby making it possible to continually monitor the position of a mobile unit in a device implementation space without having any physical contact with the mobile unit and independently of whether the implementation space is in darkness or low visibility lighting conditions.

Still another object of the invention is to be able to monitor the movement of a plurality of mobile units in a device implementation space without having to send a separate set of ultrasonic signals with respect to each individual mobile unit. A related object is to fixedly mount an array of transmitters above a device implementation area and to locate receivers on the top portion of each mobile unit in order to achieve a direct signal path from the transmitters to the receivers independent of their location within the implementation space.

Yet another object of the invention is to simplify the calculations required to determine the change of a mobile unit's position by mounting an emitter array of ultrasonic transmitters so that they remain in the same relative fixed position between themselves even though the array may move as a unit. A related object is to mount a detector array of ultrasonic receivers so that they remain in the same relative fixed position between themselves even though the array may move as a unit. Another related object is to allow the mobile unit to move through angular displacement as well as to move through a translational displacement.

Still a further object is to provide a single detector for receiving ultrasonic signals from each of the different ultrasonic transmitters. A related object is to provide circuitry connected with each receiver for determining the time of travel of each ultrasonic signal from its transmitter to the receiver.

A further object is to provide a viewing screen which displays one image for the right eye and another image for the left eye in order to achieve realistic stereoscopic display of the simulated environment.

Another object is to provide three separate ultrasonic transmitters which send signals to three separate ultrasonic receivers, and to provide digital circuitry associated with each of the receivers to measure the time taken for the signal to travel from each of the transmitters to the receiver. A related object is to provide a method of processing the time measurement data in order to determine the changed location and alignment of a mobile unit which carries either the three transmitters or alternatively the three receivers.

Another object is to provide flexibility so that the simulated world does not have to be in its true size relative to the viewer's size, but could include a scaled down version as might be used when teaching relative views encountered while traveling through the solar system, or alternatively a scaled up version such as would be encountered by a viewer walking through and around the molecular structure of various compounds.

A further object is to provide means for allowing a viewer to interact with the simulated visual environment by directing a pointer toward a specific thing as viewed on the screen, or by reaching for and/or touching a specific thing as viewed on the screen.

Another object is to provide a method of visually moving through a simulated environment by operating a manual control which allows the viewer to remain stationary in the device implementation space while changing the position and/or orientation in the simulated environment.

These and other objects of the invention will become evident to those skilled in the art based on the exemplary embodiments of the invention shown in the attached drawings and described in detail hereinafter.

IN THE DRAWING

FIG. 9 is a schematic block diagram showing the exemplary processing circuitry for an individual ultrasonic receiver and EM receiver of the type that may be used for both embodiments of the invention;

FIG. 10 is a timing diagram showing the sequence of signals transmitted intermittently from the array of ultrasonic transmitters of FIG. 8;

FIG. 11 is a timing diagram showing the sequence of signals received by each individual receiver of FIG. 9; and FIGS. 12A through 12D are schematics showing the geometric parameters used to determine the placement and line-of-sight of a viewer's eye relative to the fixed emitter array.

DETAILED DESCRIPTION OF THE EMBODIMENTS

Figure 1:
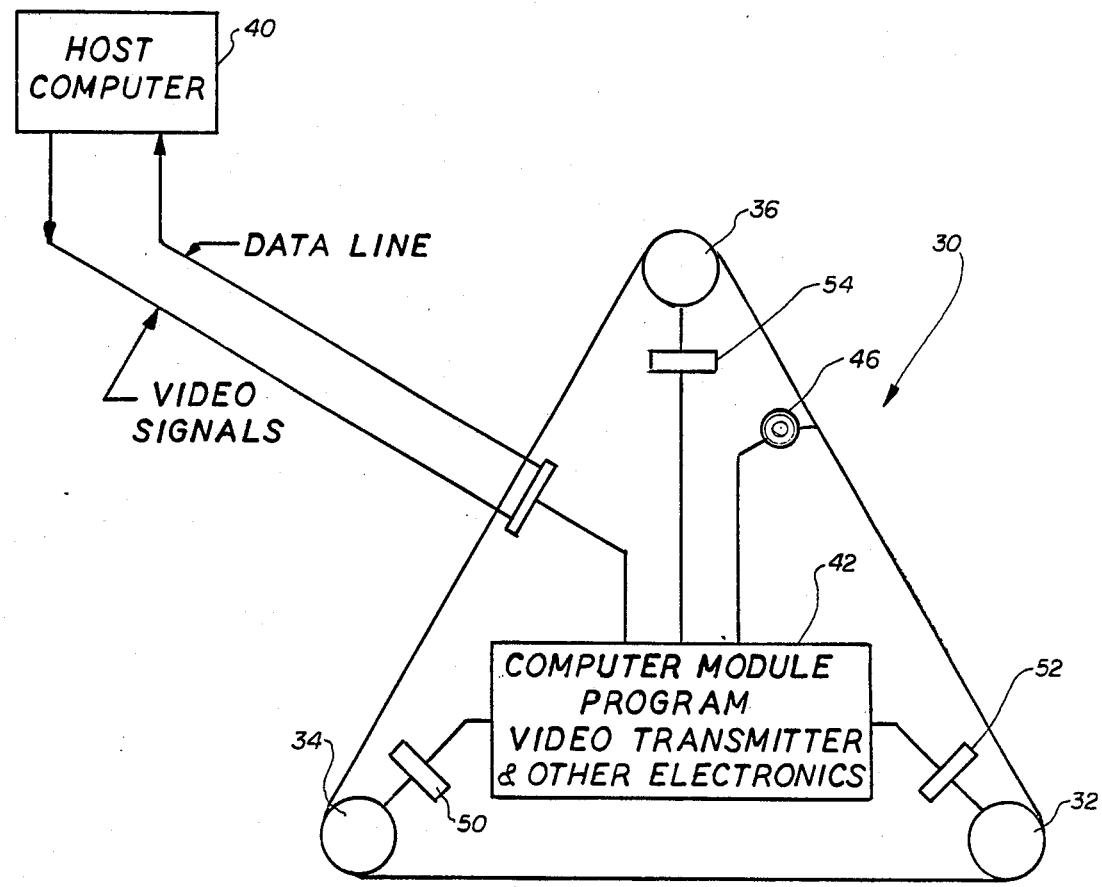
FIG. 1 is a plan view of a first embodiment of the invention showing an array of ultrasonic receivers in fixed positions on a wall unit.
Figure 2:
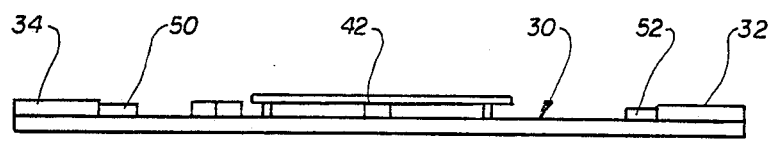
FIG. 2 is a side view of the wall unit of FIG. 1.
Figure 3:
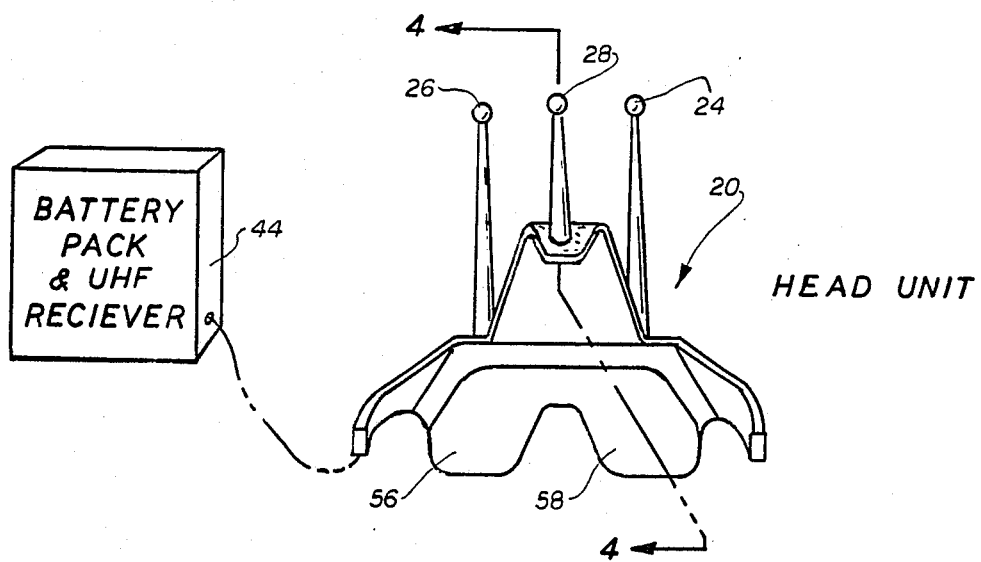
FIG. 3 is a rear elevational view of the embodiment of FIG. 1 showing ultrasonic transmitters mounted on a head unit.
Figure 4:
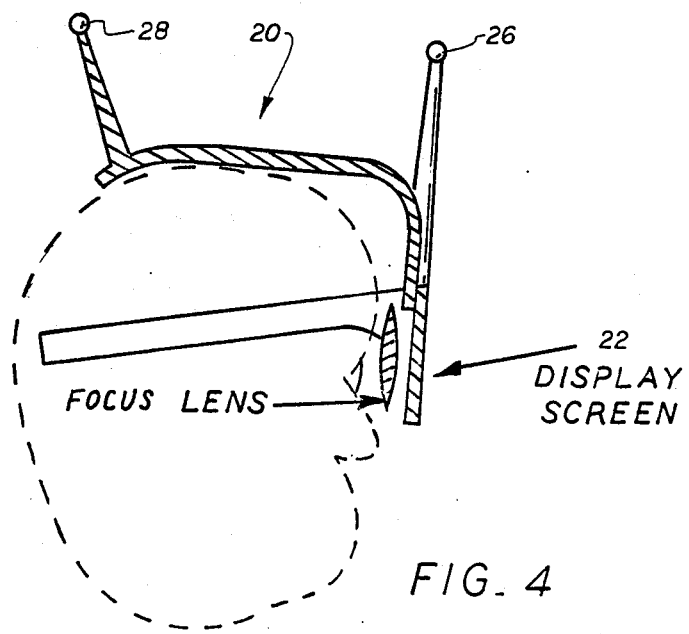
FIG. 4 is a sectional view of the head unit taken along lines 4—4 of FIG. 3 and showing a user's head in phantom.

Generally speaking, the method and apparatus of the present invention enables a person to use graphics data stored in a computer to provide an up-dated three dimensional depiction of a simulated environment by displaying the visual data of that environment on a video screen. Moreover, the perception of this simulated environment can be viewed from any point in that environment, and in any direction that corresponds to the direction of sight of the person wearing the head unit.

An early first embodiment of the invention was conceived for monitoring the movements of a single viewer in a device implementation space where a three-receiver wall unit processed ultrasonic signals sent from three transmitters mounted on a helmet worn by the viewer moving about in the implementation space (see FIGS. 1–4). Later, a second improved embodiment was conceived which utilized three fixed overhead transmitters sending ultrasonic signals to one or more mobile units moving independently about in a physical training space. It will be understood by those skilled in the art that both embodiments enable revised visual images to be transmitted to a display screen as often as thirty times per second (or some other appropriate number) so that changes of location and orientation caused by the user standing up, sitting down, moving about, or tilting the head will result in corresponding changes in the images of the simulated environment appearing on the display screen. Thus, a person (or other mobile unit such as a vehicle) carrying the head unit can be free to move about within a radial distance of up to twenty-five feet (a diameter of fifty feet) and can see displayed upon the screen a three dimensional view into various parts of the surrounding simulated environment.

Referring now to the first embodiment of the invention as shown in FIGS. 1–4, the invention provides for a head unit 20 which incorporates a display screen 22 and three ultrasonic transmitters 24, 26, and 28 extending outwardly from the head unit (fixed station) 20. A wall unit 30 incorporates three separate ultrasonic receivers 32, 34, and 36 for receiving intermittent ultrasonic signals from the transmitters mounted on the head unit (mobile station). Based on the length of time it takes for a sound pulse to travel from an individual transmitter to each of the three receivers in the wall unit, a host computer 40 can process the transit time information and generate a video signal back to a video transmitter 42 mounted on the wall unit 30. This video signal is then transmitted to receiver 44 attached to the viewer, and this receiver sends the transmitted image for display on screen 22 for immediate observation by the person wearing the head unit.

In order to measure the transit time taken for each ultrasonic pulse to travel from one of the ultrasonic transmitters on the head unit 20 to the ultrasonic receivers on the wall unit 30, UHF cue signal transmitter 46 is located on the wall unit to supply an initial signal to actuate the head unit-mounted ultrasonic transducers to commence sending position signals. In that regard, UHF receiver 44 is designed to detect the cue signal from the transmitter 46. When the ultrasonic transmitters on the head unit send the ultrasonic signals to the wall unit, each of the three ultrasonic receivers 32, 34, and 36 separately detects each ultrasonic signal generated from the head unit. In this regard, counter and latch assembly circuits 50, 52, and 54 are provided to record the transit time taken for the ultrasonic signal to travel from the head unit tranducers to the wall unit transducers. It is also to be noted that because the speed of sound varies in accordance with temperature and barometric pressure changes as well as other factors, the ultrasonic transducers on the wall unit, whose primary purpose is for detection of the ultrasonic signals, can also be used as transmitters for the purpose of calibrating the speed of sound, and this can be done as often as is necessary to assure that precise calculations will be made by the processor in computing the actual distance of the path taken from each transmitter on the head unit to each receiver on the wall unit.

Of course, it will be appreciated that the UHF cue transmitter can be located with the ultrasonic transmitters or with the ultrasonic receivers or separately from both, so long as it is operatively coupled to both.

Figure 6A:
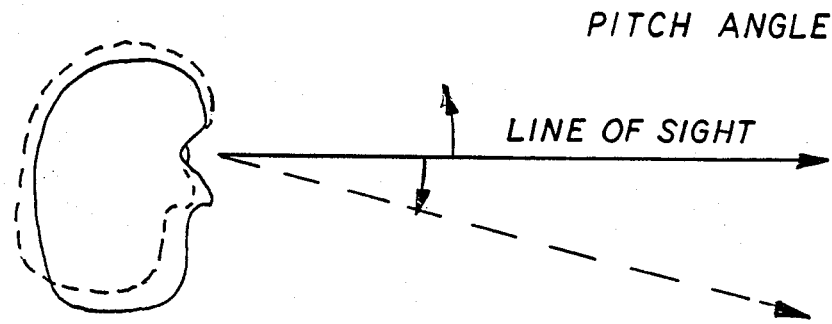
FIGS. 6a, 6b and 6c are schematic diagrams respectively showing the pitch, yaw, and roll angular parameters used to specify the line-of-sight of a viewer.
Figure 6B:
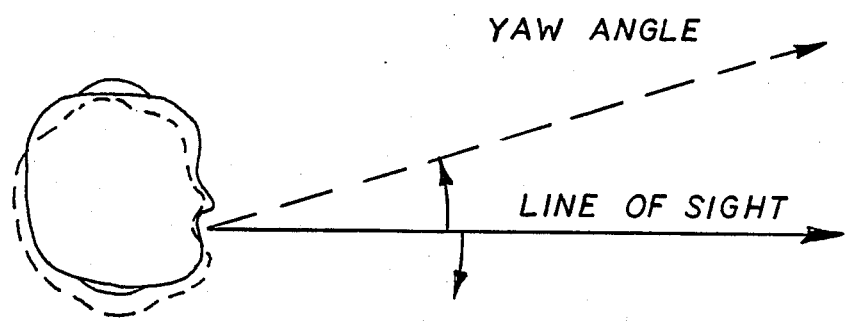
Figure 6C:
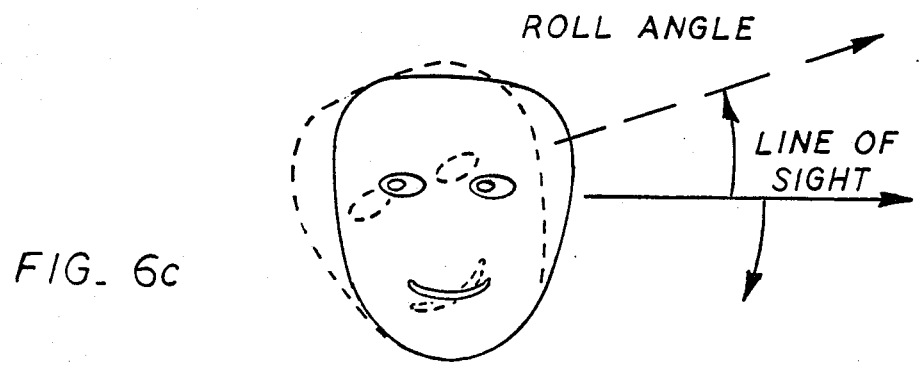

As a way for enhancing the realism of the visual images displayed on the viewer's screen, stereoscopic means is provided which incorporates a left eye screen 56 and a right eye screen 58. When a stereoscopic screen is used, a change of position of the viewer is calculated independently for each eye. In that regard, since the position of each eye is a predetermined characteristic of the design and structure of the helmet, the position of the eye with respect to each ultrasonic transmitter remains the same even though the head and body of the viewer may be translated or rotated into different positions. In addition to location, the traditional angular orientation parameters of pitch, roll, and yaw (see FIGS. 6a, 6b, 6c) are all that is required in order to enable the host computer 40 to provide video signals independently for a right eye image and for a left eye image (i.e. a separate image corresponding to the position of each eye). This stereoscopic feature provides for realistic imagery so that for every new position the user takes, and for every different orientation of the head, the user sees a view corresponding to the actual view which would be seen if the user were actually in the environment being simulated. In other words, the user will be able to walk around all sides of objects, thereby transposing the user into the simulated "world" without having to actually construct a physical model of that world and without having the user actually visit and walk through that physical model.

In the drawing the visualization screens 56 and 58 are either flat panel liquid crystal displays (LCD's) or television-type screens (CRT's). In enhanced versions of the invention one may choose to account for peripheral vision through the use of curved video screens.

Figure 5:
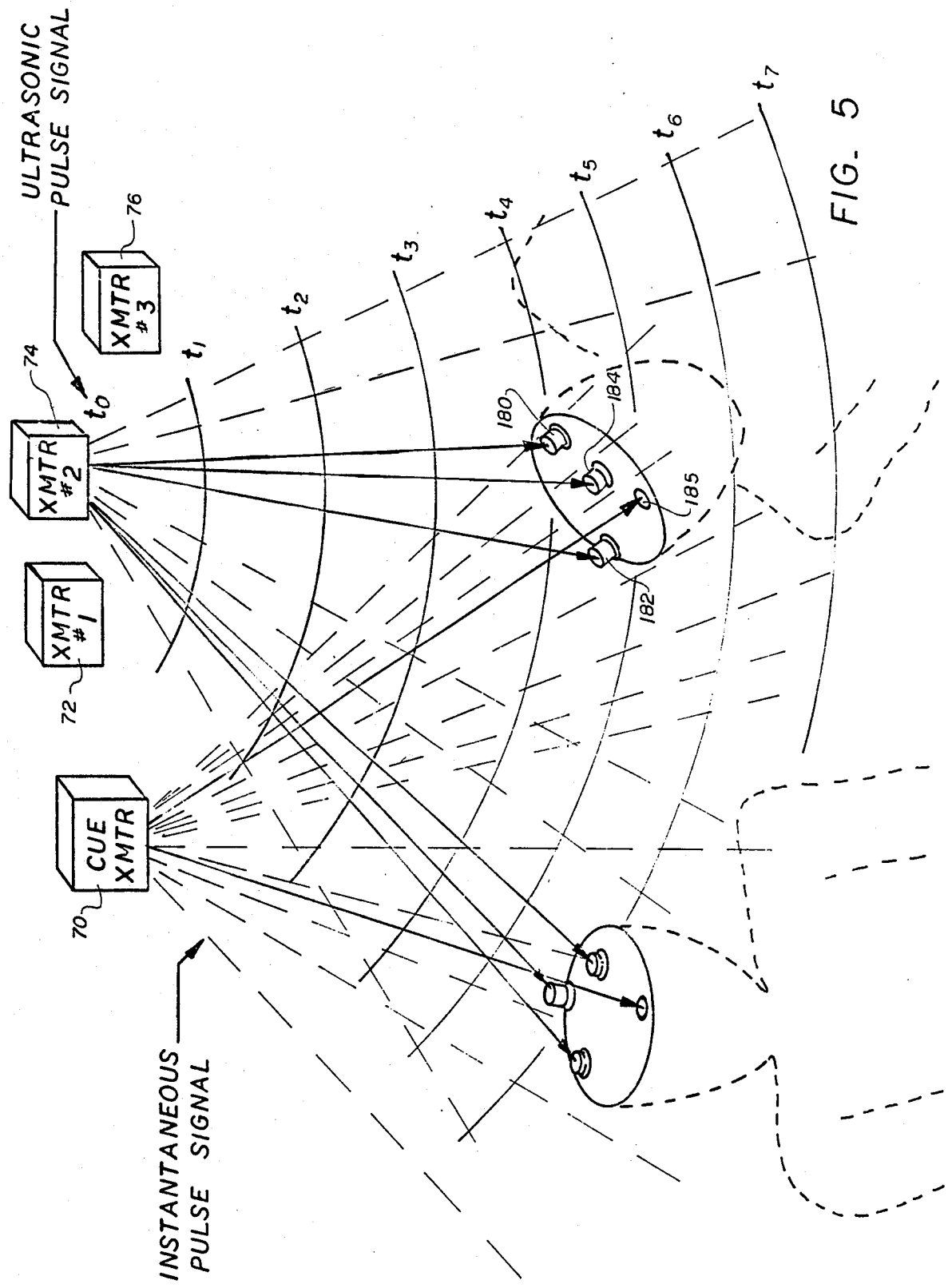
FIG. 5 is a schematic perspective view of a second embodiment of the invention showing multiple viewers within the device implementation space each wearing a head unit having an array of ultrasonic receivers mounted therein.
Figure 7:
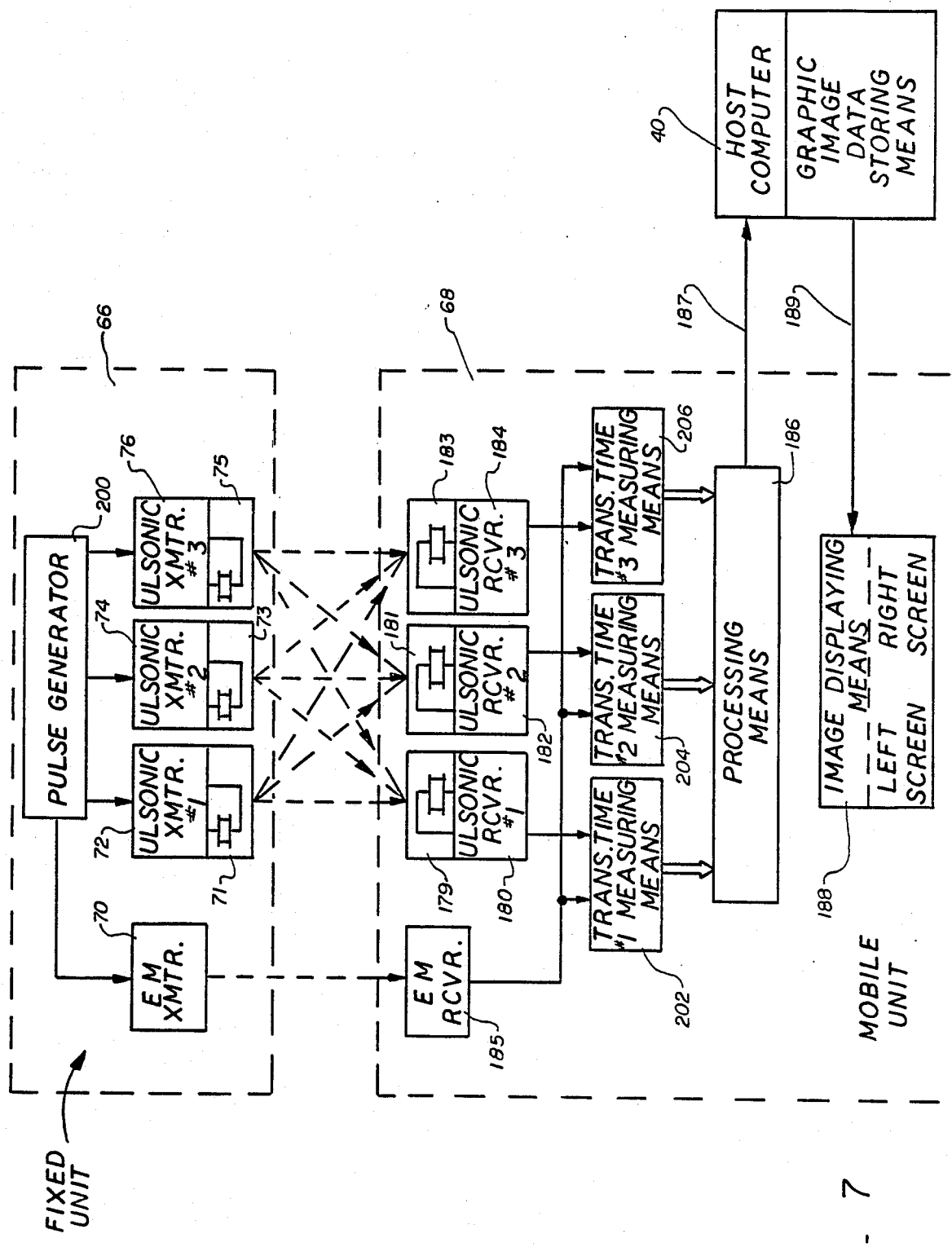
FIG. 7 is a block diagram of the entire system for implementing the second embodiment as shown in FIG. 5.

In a presently preferred second embodiment as shown in the schematic diagram of FIG. 5 and the block diagram of FIG. 7, a pulse generator 200 located on fixed unit 66 intermittently actuates EM transmitter 70 to initiate a cue signal and at the same time actuates each of three transmitters 72, 74, and 76, also located on the fixed emitter array unit to initiate a sonic signal. As shown by the exemplary circuitry in FIG. 8, each of the three ultrasonic transmitters 72, 74, 76 are operably connected through pulse generator 200 to the EM transmitter 70. The EM signal generated by EM transmitter 70 is received at the speed of light by EM receiver 185 located on mobile unit 68, causing the departure time of the ultrasonic signal to be noted simultaneously by the counter circuits associated with each of receivers 180, 182 and 184 which are also located on mobile unit 68. The time it takes an ultrasonic signal to travel from a transmitter to each receiver is measured and recorded by that receiver's respective measuring circuit 202, 204 or 206, of which one example circuit for one receiver assembly is shown in FIG. 9. The sonic signal transit time measurements from the counter circuits are then sent to processing means 186, which processes the transit time measurements, in the form of nine separate parameters for each set of three ultrasonic signals sent by respective transmitters 72, 74 and 76 to each of receivers 180, 182 and 184. Processor 186 is preferably programmed with the appropriate reference data identifying the geometric position coordinates of the ultrasonic transmitters 71, 73 and 75 on the fixed unit, as well as the geometric configuration of the ultrasonic receivers 179, 181 and 183 on the mobile unit. Using this implementation space reference data, the processor 186 processes the measurements to provide updated position coordinates on line 187 informing the host computer 40 exactly where the viewing point is located, as well as its direction along and rotation about its associated line-of-sight. In response, the host computer generates the appropriate image display signals, which are then sent on line 189 to a viewing screen 188. Thus, viewing screen 188 displays visual images which are correlated with the updated location and rotational orientation coordinates of the mobile unit 68.

This preferred embodiment has several advantages over the embodiment of FIGS. 1-4, including the ability to have several viewers/mobile units in the device implementation space without expanding the transmitter array. Also, by placing the emitter array overhead of the space, the likelihood of ultrasonic shadowing of one mobile unit by another is virtually eliminated, as well as the ultrasonic shadowing (and hence, signal interruption) of the mobile head unit receiver and/or other components on the same mobile unit.

As additional improvements to the basic concept of the invention, it is possible to provide the user with additional capability to interact with the simulated 3-D environment. For example, one additional ultrasonic receiver allows for a "spatial switch" unit where particular 3-D coordinates can be dedicated for specific purposes of the person viewing the display screen. In another example, two additional ultrasonic receivers allow for a "pointer" unit where particular positions can be generated in the 3-D environment which are similarly dedicated for specific purposes with respect to the simulated environment.

It is to be noted that in both embodiments the processor can be incorporated as part of the fixed unit, or as part of the mobile unit or else be a separate unit or else be incorporated as part of the host computer.

Referring to the timing diagram of FIG. 10, it is noted that a first EM signal transmitted by the EM transmitter starts at the same time as the ultrasonic pulse 79 transmitted from the #1 transmitter. Similarly, a second EM signal starts at the same time as the #2 ultrasonic pulse 81, and a third EM signal starts at the same time as the #3 ultrasonic pulse 83. A fourth EM signal 85 is used to clear/reset some of the digital circuitry on the mobile unit.

Figure 8:
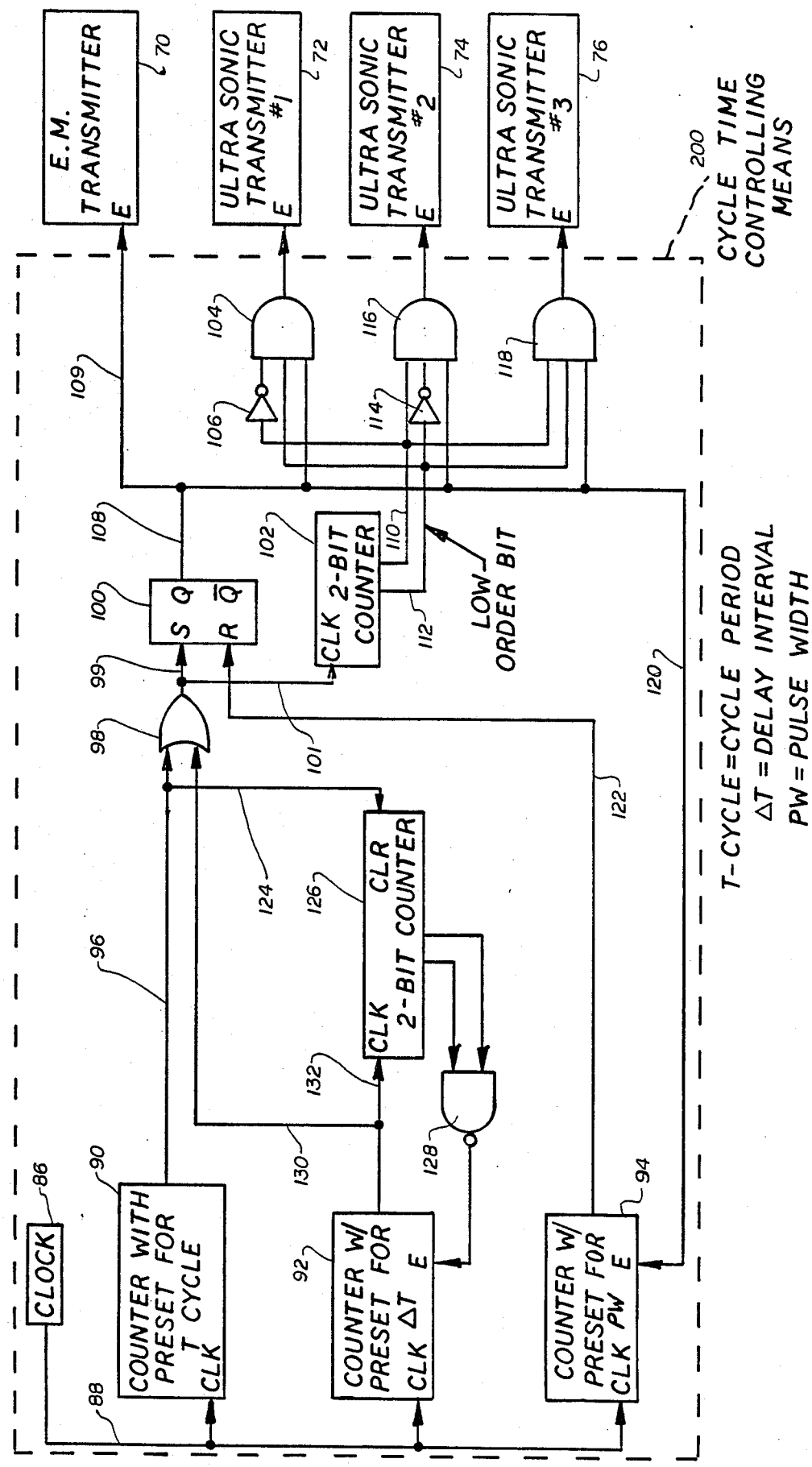
FIG. 8 is a schematic block diagram showing exemplary circuitry for an array of ultrasonic transmitters and EM transmitter of the type that may be used for both embodiments of the invention.
Figure 12C:
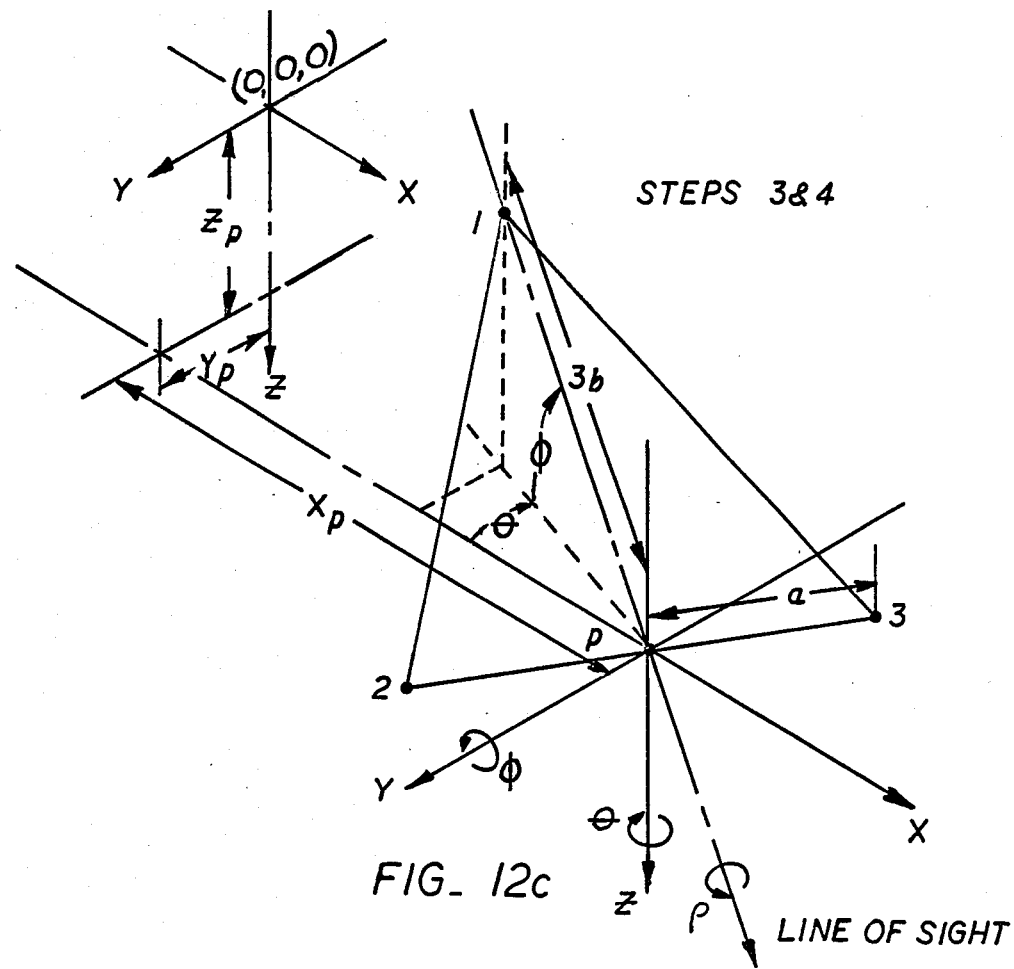
Figure 12D:
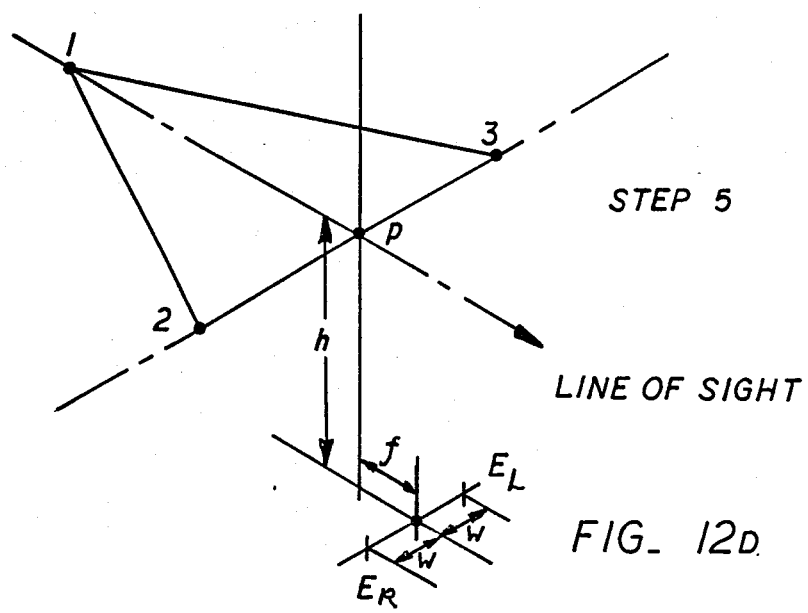

Exemplary pulse generator circuitry 200 for timing the initiation of the sequence of signals in diagram FIG. 10 is shown in FIG. 8. In this regard, the "T" cycle period is shown on the FIG. 10 timing diagram as 80, the delay interval ΔT is shown as 82, and the pulse width PW is shown as 84. In FIG. 8, a clock signal generator 86 is connected through line 88 to three counters which have been preset for sending output signals spaced at predetermined points of time. A first counter 90 is preset for the T cycle period 80, a second counter 92 is preset for the delay interval ΔT 82, a third counter 94 is preset for the pulse width PW 84. Upon initial activation of the clock generator 86, each of the counters is loaded with the bits representing the respective predetermined time periods 80, 82, 84. At the same time a high output signal passes through line 96 to OR gate 98, and then simultaneously through line 99 to flip-flop 100 and through line 101 to 2-bit counter 102. This causes counter 102 to hold the binary number 01 with the low order bit (one) providing a high through line 112 to AND gate 104 and with the other bit (zero) passing through line 110 and inverter 106 to provide a high to AND gate 104. Also, the high signal on line 99 causes flip-flop 100 to hold line 108 high. The processing delays for flip-flop 100 and counter 102 are about the same, so that the flip-flop output of on line 108 reaches AND gate 104 at about the same instant as the other outputs coming from counter 102 so that both transmitter #1 and the EM transmitter (enabled through line 109) will start their pulse signals at the same time as shown in the timing diagram. Transmitter #2 is dormant while line 110 and the high of line 112 passed through inverter 114 are low so that AND gate 116 outputs a low signal. Transmitter #3 is a dormant while line 110 is low so that AND gate 118 outputs a low signal.

The high signal on line 108 passes through line 120 and enables counter 94 into active mode to start counting. When the appropriate pulse width time has been counted, counter 94 sends a high along line 122 to flip-flop 100, thereby causing line 108 to go low and ending the transmission by the EM transmitter and ultrasonic transmitter #1.

Since line 96 is connected to the clear input CLR of counter 126, each high signal on line 96 (i.e. at the beginning of each cycle 80) clears counter 126, thereby enabling counter 92 to cycle. Each cycle of counter 92 causes counter 126 via line 132 to increase its count by one. Counter 92 goes through four cycles when it is disabled by a low output from NAND gate 128 as the result of a logic 11 on the output from counter 126. When the appropriate delay interval time has been counted by counter 92, it send a high signal along line 130 to OR gate 98, thereby changing the flip-flop output on line 108 to high. However, this time it is transmitter #2 that commences a pulse signal simultaneously with the EM signal from the EM transmitter. More specifically, the counter 102 now holds binary number 10 causing AND gate 104 to output a low signal and causing AND gate 116 to output a high signal. Gate 118's output signal remains low because of the low signal in line 112.

Each time counter 92 sends a high signal to initiate a new ultrasonic pulse from one of the transmitters, that high signal is passed through line 132 to increase the binary number in 2-bit counter 126. So long as the output of NAND gate 128 remains high, the counter 92 is programmed to automatically start counting the delay interval again. Thus, 00 held in counter 126 starts counter 92 counting the first delay interval, 01 held in counter 126 starts counter 92 counting the second delay interval, and 10 held in counter 126 starts counter 92 to count the third delay interval. But when a high signal on line 130 marks the end of the third delay interval, the high signal also passes through line 132 to change the binary number in counter 126 to 11, thus causing AND gate 128 to output a low signal, and disabling counter 92.

Similarly, each time OR gate 98 sends a high to line 99, the high also passes through line 101 to increase 2-bit counter 102 by one. Thus, when counter 102 holds the binary number 11, AND gates 104 and 116 output laws, while AND gate 118 receives three high inputs, the (FIG. 10) pulse signal 83 is sent from transmitter #3. When the final high originates from counter 92 and ultimately causes the FIG. 8 EM transmitter to send the FIG. 10 pulse 85, the counter 102 holds the binary number 00 which causes all three AND gates 104, 116, 118 to output lows. Thus the emitter circuitry is ready to begin another cycle with counter 126 holding the binary number 11 and counter 102 holding the binary number 00. Of course, the cycle starts again when counter 90 has counted the appropriate time interval for the cycle.

It is apparent that the counter 94 is enabled through line 120 to control through line 122 the duration of the pulse width whereby it is the same for each ultrasonic and EM signal.

Referring to the timing diagram of FIG. 11, the arrival of various EM pulses and ultrasonic pulses is shown graphically for a given receiver. More specifically, a first EM pulse 134 corresponds to and identifies the starting time of the transmission of an ultrasonic pulse signal 135, a second EM pulse 136 corresponds to and identifies the starting time of a second ultrasonic signal 137 sent from a different transmitter such as 74, and a third EM pulse 138 corresponds to and identifies the starting time of a third ultrasonic signal 139 sent from another transmitter such as 76.

Referring now to the exemplary circuit design of FIG. 9, it is possible to have a single EM receiver 140 (185 in FIG. 7) operably connected to each individual ultrasonic receiver and its related counting circuitry. As each EM pulse is received at the mobile unit, it activates a 2-bit counter 142 which is connected through lines 141, 143 to a series of AND gates 144, 146, and 148. In order to sequentially activate AND gates 144, 146, and 148, line 141 carries the low order bit from 2-bit counter 142 directly to AND gates 144 and 148, but through an inverter 145 to gate 146. Similarly, line 143 carries the higher order bit from 2-bit counter 142 directly to gates 146 and 148, but goes through an inverter 147 to gate 144. Thus, as counter 142 holds binary number 01 upon receiving pulse 134, gate 144 receives two high inputs and therefore transmits a high to flip-flop 160 to activate a counter 166 which starts counting the transit time for the related ultrasonic signal 135 to travel from its transmitter 72 to an ultrasonic receiver 150. During this period, both AND gates 146 and 148 output lows. The ultrasonic receiver 150 (representing receiver 180, 182 or 184 in FIG. 7) is similarly connected through a 2-bit counter 152 to a series of AND gates 154, 156, and 158, with line 153 carrying the low order bit and line 155 carrying the other. Line 153 connects directly to gates 154 and 158 but goes through an inverter 157 to gate 156. Line 155 goes directly to gates 156 and 158, but goes through an inverter 159 to gate 154. Thus, when the ultrasonic receiver receives the ultrasonic signal 135, counter 152 carries the binary number 01, thereby disabling gates 156 and 158 but enabling gate 154 to transmit a high into the reset input of flip-flop 160 as well as sending an enabling sinal to a latch 168 which immediately latches on and records the transmission time measured by counter 166.

When the EM receiver 140 receives the second pulse 136, and the 2-bit counter 142 now carries the binary number 10, gate 146 sends a high to flip-flop 162 which activates counter 170 to start counting the transmission time for ultrasonic signal 137. When the receiver 150 receives the ultrasonic signal 137, the binary number in the 2-bit counter 152 is changed to 10, thereby enabling gate 156 to send a high signal to the reset input of flip-flop 162 which stops the counter 170, while at the same time sending an enabling signal to latch 172 which latches and holds the transit time counted by counter 170. Similarly, when the third pulse signal 138 is received by the EM receiver 140, counter 142 now provides the binary number 11 which enables gate 148 and sends a high to flip-flop 164 to start counter 174 counting the transmission time for ultrasonic signal 139. When ultrasonic signal 139 is received by the ultrasonic receiver 150, the binary number in counter 152 is changed to 11 which enables gate 158 to send a high to the reset input of flip-flop 164, which stops the counter 174, and at the same time sends an enabling signal to latch 176 which latches and holds the correct transit time counted by counter 174.

When AND gate 158 sends a high to the flip-flop 164, it also sends a high along line 190 to the microprocessor (not shown) to indicate all the transit times have been measured. The microprocessor then sequentially addresses via bus 192 the respective latches 168, 172, and 176 thus enabling the designated latch which then sends the transit times back to the microprocessor along data bus 194.

The timing procedure for the EM cue and ultrasonic signals described above is devised to meet the following two objectives. First, when the EM marker pulse is received by the detector unit and correspondingly a particular ultrasonic emitter begins to transmit, it is important to ensure that the unit will record the transit times to each detector with regard to only that specific ultrasonic emitter. Second, it is important to ensure that each ultrasonic detector has registered the transit times before the next ultrasonic pulse is received by that detector. To accomplish the above objectives we must ensure that an ultrasonic transmission from a particular emitter occurs after a time interval ($\Delta T$) which allows the preceding ultrasonic pulse to comfortably clear the emitter array. Accordingly:

$$\Delta T = (2S)/V_s$$

where
S = the maximum distance between two emitters on the emitter array and
Vs = the speed of sound in air The timing diagram of FIG. 11 illustrates the achievement of these objectives.

Interfacing with existing graphics software packages necessitates providing the host computer 40 with location and orientation information so that the appropriate field of view can be generated for video display. The generation of a stereoscopic field of view requires the determination of the location of each eye and the orientation corresponding to the "line of sight". If we are given the geometries of both the fixed unit and the mobile unit, and also if we are given the measured transit times between the three emitter elements and each respective detector element, then the eye location and orientation can be calculated in the following steps (see FIG. 12A–D). STEP 1, given the geometry of the fixed unit, we define a fixed coordinate system with respect to the three emitters. STEP 2, given the transit times from the three emitters to each of three detectors (nine transit times altogether), the coordinates of each detector are calculated. STEP 3, given the geometry of the detector array, (a) we define an arbitrary location relative to this geometry as the "placement of the detector array", and (b) we define an orientation of the detector array with respect to the fixed coordinate system (in the present embodiment the orientation angles correspond to pitch, roll, and yaw). STEP 4, given the coordinates of each detector, we calculate the defined orientation and location of the detector array. STEP 5, given the geometry of the mobile head unit and the location and orientation of the detector array, the position of each eye is calculated.

Summarizing for the present embodiments, from step 4 along a "line of sight" we find a direction and an associated roll, which we define as the preferred orientation angles. In step 5, we find the coordinates of each eye position. Thus, we have the location and orientation information necessary to generate a stereoscopic field of view.

More specifically, in STEP 1 (see FIG. 12A), in the preferred embodiment, the geometry of the fixed emitter unit has a fixed coordinate system based on an equilateral triangle of side S with emitter A, B, and C at the vertices and origin O specified at the centroid. Assigning $a = S/2$, $b = a \cdot \tan 30$ we have

| | | |
|---|---|---|
| $X_A = 0$ | $Y_A = 2b$ | $Z_A = 0$ |
| $X_B = -a$ | $Y_B = -b$ | $Z_B = 0$ |
| $X_C = a$ | $Y_C = -b$ | $Z_C = 0$ |

In STEP 2 (see FIG. 12B), in order to calculate coordinates of a particular detector, transit times $t_A$, $t_B$, $t_C$ are multiplied by speed of sound $V_s$ to give transit distances $l_{AD}$, $l_{BD}$, $l_{CD}$ of a detector D from each respective emitter A, B, and C. By substituting the known emitter coordinates and solving the usual geometric equations, we can find the coordinates $X_D$, $Y_D$, and $Z_D$ for an individual detector D:

$$(X_D - X_A)^2 + (Y_D - Y_A)^2 + (Z_D - Z_A)^2 = l_{AD}^2$$

$$(X_D - X_B)^2 + (Y_D - Y_B)^2 + (Z_D - Z_B)^2 = l_{BD}^2$$

$$(X_D - X_C)^2 + (Y_D - Y_C)^2 + (Z_D - Z_C)^2 = l_{CD}^2$$

In STEP 3 (see FIG. 12C), we provide a definition of the placement and orientation of the detector array. In the preferred embodiment, we assume the detector array has the same geometry as the emitter array. Illustrated is an equilateral triangle of side S with detectors "1", "2", and "3" where $a = S/2$ and $b = a \tan 30$. We define the "placement of the detector array" at point $P = (X_p, Y_p, Z_p)$ through which pass the axes of rotation corresponding to yaw ($\theta$), pitch ($\phi$) and roll ($\rho$) as defined in the drawing. We note in the "home" position point P is coincident with origin O and $\theta = 0$, $\phi = 0$, $\rho=0$, characterizing the situation where points "1", "2", and "3" all lie in the X-Y plane with side 2←→3 along the x-axis and "line of sight" axis 1←→p along the x-axis.

In STEP 4 (see FIG. 12C), the placement of the detector array and the orientation angles are calculated. Using the procedure described in step 2, the coordinates of detectors "1", "2", and "3" are found to be $(X_1, Y_1, Z_1)$, $(X_2, Y_2, Z_2)$, and $(X_3, Y_3, Z_3)$ respectively. Referring to the illustration in step 3, we see that P is conveniently located at the midpoint of the line segment connecting "2" and "3", thus $X_p=(X_2+X_3)/2$, $Y_p=(Y_2+Y_3)/2$, $Z_p=(Z_2+Z_3)/2$. The trigonometric inverse formulae for the orientation angles follow directly from an analysis of the given geometry. It will be known to those skilled in the art that supplemental geometric considerations are required for correct quadrant placement since trigonometric inverses are single-valued only over a specified range:

$$\phi = \sin^{-1}((Z_1-Z_p)/3b)$$

$$\theta = \tan^{-1}((Y_p-Y_1)/(x_p-X_1))$$

$$\rho = \sin^{-1}((Z_2-Z_p)/(a \cdot \cos \phi))$$

$-90° < \phi < 90°$ for $X_1 < X_p$ $-90° < \theta < 90°$ for $X_1 < X_p$ $-90° < \rho < 90°$ for $Y_2 > Y_p$ In STEP 5 (see FIG. 12D), from the geometry of the head unit the eye positions are calculated. The geometry of the head unit specifies the displacement of the right and left eye locations from position P as illustrated. At the "home" position P at (0,0,0) and $\theta=\phi=\rho=0$, the right and left eye locations are given as $E_R°=(f,w,h)$ and $E_L°=(f,-w,h)$. The eye position vector associated with a point $E=(X_E, Y_E, Z_E)$ represents a known translation $\{X_p, Y_p, Z_p\}$ and rotation $\{\theta, \phi, \rho\}$ of the corresponding "home" position vector associated with point $E°=(f,\pm w,h)$. A general rotational transformation matrix R is then found from the matrix transformations associated with the pitch, roll, and yaw as defined in step 3. Thus, the desired eye position vector is calculated by multiplying this matrix R by the "home" eye position vector and adding the known translation vector (e.g. the right eye):

$$\begin{bmatrix} X_{ER} \\ Y_{ER} \\ Z_{ER} \end{bmatrix} = R \begin{bmatrix} f \\ w \\ h \end{bmatrix} + \begin{bmatrix} X_p \\ Y_p \\ Z_p \end{bmatrix}$$

where $$R = \begin{bmatrix} \cos\theta\cos\phi & \cos\theta\sin\phi\sin\rho - \sin\theta\cos\rho & \cos\theta\sin\phi\cos\rho + \sin\theta\sin\rho \\ \sin\theta\sin\phi & \sin\theta\sin\phi\sin\rho + \cos\theta\cos\rho & \sin\theta\sin\phi\cos\rho - \cos\theta\sin\rho \\ -\sin\phi & \cos\phi\sin\rho & \cos\phi\cos\rho \end{bmatrix}$$

In the preferred embodiment, it is important that three separately positioned ultrasonic transmitters be mounted in fixed position relative to each other and fixed as a group relative to the device implementation area. Similarly, it is important that three separately positioned receivers be mounted in fixed position relative to each other and fixed as a group relative to the mobile unit (e.g., a person, or a vehicle). This enables a processor to go through the aforementioned steps for accurately deducing and calculating the position of each of the three ultrasonic receivers as they move about. With this information the precise spatial coordinates of the three detectors are definitively sensed and the position and orientation associated with each eye of the person watching the display screen are correctly determined.

In a typical situation, the person wearing the head unit must start out at an initial "reference" position and orientation with respect to the simulated environment. This is done by the mobile unit moving about the device implementation area or alternatively by changing the images on the viewing screen until they are satisfactory. Thereafter, it is only the changes in the viewer's position and orientation (or more specifically the viewer's head placement) relative to this "reference" that need to be fed into the processor associated with the host computer, thereby enabling the host computer to send revised video signals so that an accurate revision may be made of the simulated environment as viewed on the display screens.

Where an expanded device implementation area is desired to allow greater ranges of movement, a different emitter array can be mounted to be adjacent to each portion of the training area. Alternatively, by adding additional digital measurement circuits with the receivers, it would be possible to begin transmission of a new cycle of ultrasonic pulses before the first set had been completely processed, all within the spirit of the invention.

While specific exemplary embodiments of the invention have been illustrated and described, it will be appreciated by those skilled in the art that various changes and modifications can be made without departing from the scope of the invention as set forth in the attached claims.

We claim as our invention:

1. Apparatus for periodically indicating the location and pitch, roll, and yaw orientation coordinates of a mobile unit, moveably disposed within a predefined implementation space, in terms of display images simulating an environment, comprising:
   emitting means including three ultrasonic transmitters, fixedly disposed on, and relative to said space, for sending ultrasonic pulses into said space;
   detecting means including three ultrasonic receivers fixedly disposed on, and relative to, said mobile unit, for receiving ultrasonic pulses sent from said transmitters;
   measuring means, operatively coupled both to said emitting means and to said detecting means, for measuring the transit time intervals from the time when each transmitter initiates sending an ultrasonic pulse until the times when each of said three receivers receives that pulse, and for developing therefrom position indication signals;
   host computing means for storing graphic image data characterizing said environment, connected to receive input signals corresponding to said position indication signals and operative to use said image data to generate updated video image display signals representing said environment in the perspective from the position of said mobile unit; and
video image displaying means, diposed fixedly with respect to said mobile unit, and coupled to receive said image display signals from said host computing means, for using said display signals to display images of said environment.

2. The apparatus of claim 1 further comprising processing means, connected between said measuring means and said computing means, to receive said position indication signals and operative to calculate updated position coordinate signals identifying the position of said mobile unit and to provide said position coordinate signals as input signals to said host computing means.

3. Apparatus for periodically indicating the movement and directional alignment of a mobile unit capable of being translated and rotated from position to position within a predefined implementation space, said apparatus comprising:
pulse emitting means including first, second and third ultrasonic transmitters each physically separated from, and fixedly disposed relative to, the other transmitters and all fixedly disposed relative to either one of the implementation space or the mobile unit;
pulse detecting means including first, second and third ultrasonic receivers each physically separated from the other receivers and all fixedly disposed relative to the other of the implementation space or the mobile unit;
cycle time controlling means operatively coupled to activate each of said transmitters to initiate sending ultrasonic pulses at predetermined time intervals;
processing means responsive to said time controlling means activating each of said three transmitters and to each of said three receivers receiving pulses to calculate the distances from each of said three transmitters to each of said three receivers, and from said distances to update position coordinates of said mobile unit;
image data storing means for storing graphic image data characterizing the three dimensional representation of an environment; and
graphic image displaying means responsive to display signals, generated from said image data and from said position coordinates, to display images simulating said environment from the perspective of successive positions of said mobile unit.

4. The apparatus of claim 3 wherein said pulse emitting means is disposed fixedly relative to said mobile unit and said pulse detecting means is disposed fixedly relative to, and with an unimpeded line of sight to all points in, said implementation space.

5. The apparatus of claim 3 wherein said pulse detecting means is disposed fixedly relative to the mobile unit and said pulse emitting means is disposed fixedly relative to, and with an unimpeded line of sight to all points in, said implementation space.

6. The apparatus of claim 3 wherein said time controlling means activates one transmitter at a time in a predetermined sequence to send a sonic pulse.

7. The apparatus of claim 6 wherein said time controlling means includes a electromagnetic cue signal transmitting means and said pulse detecting means includes electromagnetic cue signal receiving means for causing said processing means to begin from each transmitter's initiation of sending each sonic pulse to calculate said distances.

8. The apparatus of claim 3 further comprising host computing means connected to said processing means and to said image data storing means to retrieve graphic image data from said storing means and responsive to said position coordinates to transform said image data into image display signals representing said environment from the perspective of the position of said mobile unit.

9. A mobile viewing unit suitable to be worn on a person's head, said unit comprising:
processing means responsive to viewing unit position indication signals to calculate updated position coordinates and including output terminal means connectable to provide said position coordinates to an external video image signal generator; and
stereoscopic image displaying means including an input terminal for receiving video image display signals from said external generator, a first screen viewable by the person's left eye, and a second screen viewable by the person's right eye;
whereby, based on mobile unit movements, said external video generator provides display signals and said displaying means displays updated stereoscopic images.

10. A viewing unit as in claim 9 further comprising:
electromagnetic cue signal receiving means for receiving EM cue signals,
three sonic pulse detecting means including three receivers for detecting intermittent ultrasonic pulses from a plurality of transmitters, and
three measuring means coupled to said cue signal receiving means and to said three sonic pulse receivers, for separately timing respective receiver's reception of ultrasonic pulses sent sequentially from said three transmitters.

11. A viewing unit as in claim 10 wherein said three measuring means each comprises three counters for counting the respective intervals between the times when each of the three sequential EM cue signals are received and the times when a corresponding ultrasonic pulse is received.

12. A method of visually simulating a three dimensional environment from the perspective of a mobile unit capable of occupying different positions within a predefined implementation space, including the steps of:
sending a sequence of EM cue signals and, simultaneously with sending each cue signal, initiating transmission of an ultrasonic pulse from one of three transmitters disposed in separate locations fixed relative to said implementation space;
receiving each said cue signal using an EM receiver and receiving each said ultrasonic pulse using three sonic receivers which are fixed in separate locations relative to said mobile unit and using a fourth sonic receiver which is moveable within said space independently of said mobile unit;
measuring, from the time of receipt of each said EM cue signal, the ultrasonic pulse transit times until being received by each of said three sonic receivers, to provide position indication signals and the pulse transit time until being received by said fourth receiver to provide a fourth receiver location indication signal;
processing said position indication signals to calculate mobile unit position coordinates relative to said implementation space; and using said position coordinates to generate image display signals for visually simulating said environment in three dimensions from the perspective of said mobile unit position, and using said fourth receiver location indication signal to calculate whether said fourth receiver is located at a particular point in said space.

13. A method of visually simulating a three dimensional environment from the perspective of a mobile unit moveable between different positions within a predefined implementation space, including the steps of:

sending a series of EM cue signals and simultaneously with sending each cue signal, sending an ultrasonic pulse from one of three transmitters disposed in separate locations fixed relative to said implementation space;

receiving each cue signal using a cue signal receiver and receiving each ultrasonic pulse using three sonic receivers in separate locations fixed relative to said mobile unit and using fourth and fifth sonic receivers which are moveable within said space independently of said mobile unit;

measuring, from the time of receipt of each cue signal, the ultrasonic pulse transit times until being received by respective sonic receivers, to provide position indication signals and the pulse transit times until being received by said fourth and fifth sonic receivers to provide a fourth-to-fifth receiver interconnecting axis location signal;

processing said position indication signals to calculate mobile unit position coordinates, and to determine whether said axis is aligned in a particular direction with respect to said implementation space.

14. A method of determining the location and orientation of a unit worn by a person free to move within, and relative to, a predetermined implementation space to update visual images displayed on a screen viewable by the person, including the steps of:

intermittently sending into said space sets of ultrasonic pulses in sequence from at least three transmitters fixed in separate locations relative to said space;

receiving each sequential pulse at three receivers fixed in separate locations on said unit;

measuring the transit times from when each of the ultrasonic pulses is sent until it is received by each said receiver, to provide transmitter position indication signals;

processing said position indication signals to calculate the unit location and orientation coordinates and any change in the position of the unit since receiving a preceding set of ultrasonic pulses; and using said unit position coordinates to effect the updating of said visual images displayed on said screen.

15. A method of determining the location and orientation of a unit worn by a person free to move, and of at least one receiver free to move independently of said unit, within a predetermined implementation space, including the steps of:

sending into said space sets of ultrasonic pulses in sequence from at least three transmitters fixed in separate locations relative to said space;

receiving said pulses at three receivers located separately on the unit and at said receiver free to move independently;

measuring transit times from sending each pulse in each set until receiving each pulse at said receivers, to develop respective transit time measurements; and processing the transit time measurements to calculate the spatial and angular coordinates of the position of the unit at the time when each said set of pulses was received, and to determine whether said independently moveable receiver has particular coordinates in said implementation space.

16. A method of determining the location and orientation of a unit worn by a person free to move about, and of at least two receivers free to move independently of said unit, within a predetermined implementation space, including the steps of:

sending into said space a set of ultrasonic pulses in sequence from at least three transmitters fixed in separate locations relative to said space;

receiving said set of pulses at at least three receivers located separately on the unit and at said at least two receivers;

measuring transit times from sending each pulse in each set until receiving said pulse at said receivers, to develop respective location indication signals; and processing said location indication signals to calculate the spatial and angular coordinates of the position of the unit, and to determine whether said independently moveable receivers are aligned in a predetermined direction relative to said space, at the time when said set of pulses was received.

* * * * *